United States Patent [19]

Ichihara

[11] Patent Number: 4,509,199

[45] Date of Patent: Apr. 2, 1985

[54] POWER SUPPLY SYSTEMS FOR USE IN RADIO COMMUNICATION SYSTEMS

[75] Inventor: Masaki Ichihara, Tokyo, Japan

[73] Assignee: Nippon Electric Co., Ltd., Tokyo, Japan

[21] Appl. No.: 462,343

[22] Filed: Jan. 31, 1983

[30] Foreign Application Priority Data

Feb. 1, 1982 [JP] Japan .................................. 57-14459

[51] Int. Cl.³ .......................... H04B 1/60; H04B 7/14
[52] U.S. Cl. ........................................ 455/7; 370/97;
370/110.1; 455/51; 455/70; 455/343
[58] Field of Search ................ 455/4, 7, 15, 51, 70,
455/343, 601, 603, 38; 375/3, 107; 370/97,
110.1; 179/2 BC, 170 J

[56] References Cited

U.S. PATENT DOCUMENTS

| | | | |
|---|---|---|---|
| 3,049,709 | 8/1962 | Rianhard, Jr. ............... | 455/70 |
| 3,499,985 | 3/1970 | Rowlands et al. ............ | 370/97 |
| 4,353,065 | 10/1982 | Mori .............................. | 455/343 |
| 4,437,095 | 3/1984 | Akahori et al. ............... | 455/343 |
| 4,449,248 | 5/1984 | Leslie et al. ................. | 455/38 |

Primary Examiner—Marc E. Bookbinder
Attorney, Agent, or Firm—Blakely, Sokoloff, Taylor & Zafman

[57] ABSTRACT

In a power supply system for use in a radio communication system comprising a base station for transmitting and receiving radio signals, one or more repeater stations for repeating the radio signals, and a terminal station communicating with the base station through the repeating stations, the base station comprises means for transmitting synchronizing signal pulses at a predetermined period for effecting a battery saving type power supply. Each of the repeater station and terminal station comprises means, responsive to successive reception of a predetermined number of the synchronizing signal pulses, for effecting intermittent battery saving at a period substantially equal to the period of the synchronizing signal pulses during occurrence of the synchronizing signal pulses.

7 Claims, 7 Drawing Figures

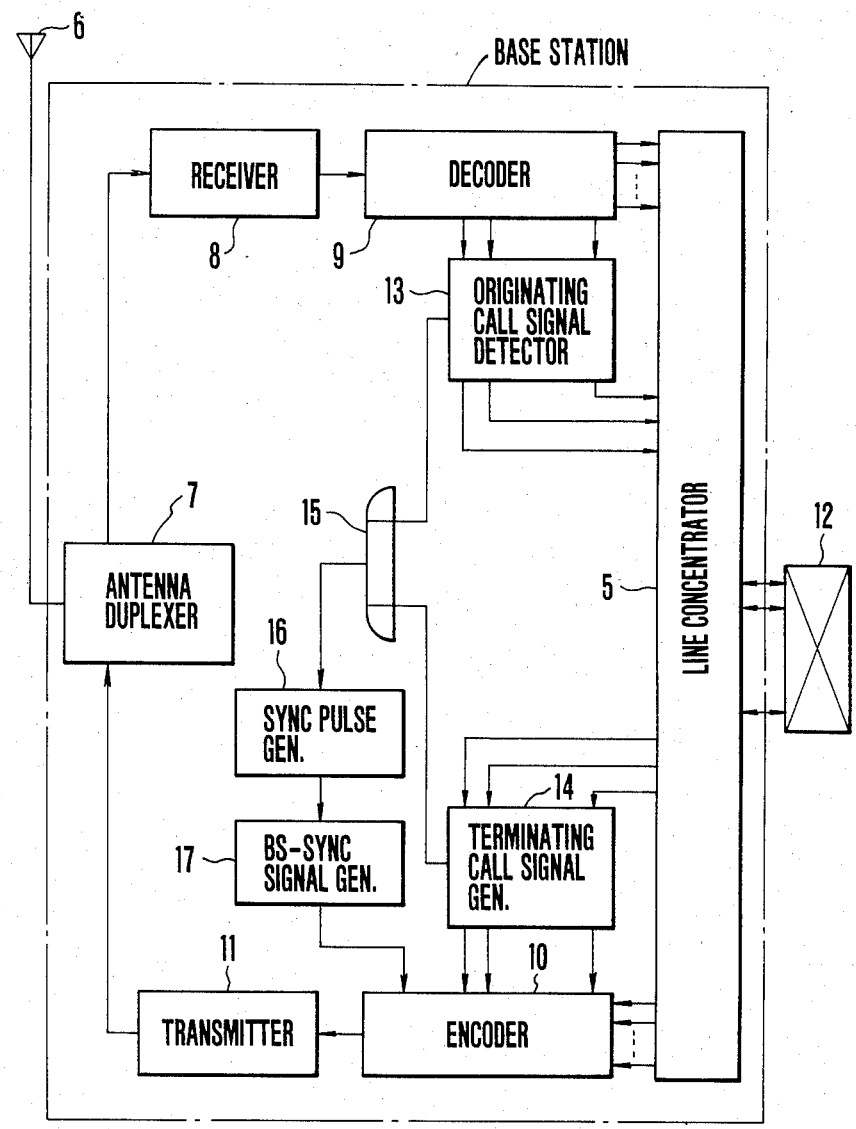
F I G. 4

POWER SUPPLY SYSTEMS FOR USE IN RADIO COMMUNICATION SYSTEMS

BACKGROUND OF THE INVENTION

This invention relates to a power supply system for receivers for use in a radio communication system, and more particularly a system of intermittently supplying power to radio receivers of repeaters and terminal devices of a radio communication system which performs a plurality of repeatings by using a time division multiplexed system so as to save power consumption during a waiting time. Hereinafter, such a system of intermittingly supplying power to receivers and transmitters is termed a battery saving system.

Heretofore, application of the battery saving type power supply system was limited to a frequency division system. Because, in the frequency division multiplexed communication system (FDM system), the channels are divided according to allotted frequencies, different from a time division multiplexed communication system (TDM system), it is not necessary to timely detect a synchronizing signal for identifying channels so that the control of the battery saving type power supply can be simplified. However, in the case of the TDM system, the battery saving type power supply system must be synchronized such that receivers of all repeaters are ON/OFF controlled synchronously as will be explained later with reference to the drawings. This raises a problem inherent to the battery saving type power system based on the TDM system.

BRIEF DESCRIPTION OF THE DRAWINGS

In the accompanying drawings:

FIG. 4 is a block diagram showing a base station embodying the invention;

Figure 1:
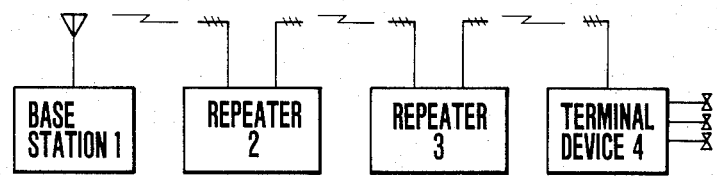
FIG. 1 is a block diagram showing a radio repeating system.

Suppose now that repeaters 2 and 3 and a terminal device 4 of a radio communication system perform battery saving type power supply at independent periods. When there is a terminating call for the terminal device 4, a terminating call signal is sent from a base station 1 to stop the battery saving type power supply or intermittent power supply at the repeater 2 and the terminating call signal is transmitted from the repeater 2 to the repeater 3 to stop the battery saving type power supply thereat. Finally, the terminating call signal is transmitted to the terminal device 4 from the repeater 3, thus stopping the battery saving type power supply thereat. By successively transmitting the terminating call signal over a considerable time in this manner, it is possible to stop the battery saving type power supply of the entire communication system even when the devices are independently supplied with powers according to the battery saving type power supply system. Similar operation is made when an originating call is made by the terminal device. In this manner, in the case of the FDM system, the battery saving type power supply can be readily controlled.

However, where the radio communication system shown in FIG. 1 is based on the TDM system, respective channels utilizes the same frequency and the channels are discriminated from each other by the time positions or time slots of the signals. Accordingly, in order to correctly connect talking lines, all of the repeaters 2 and 3 and the terminal device 4 are required to detect at all times a synchronizing signal transmitted from the base station 1 for identifying respective channels. Let us now consider a case wherein repeaters 2 and 3 and the terminal device 4 are independently operating according to the battery saving type power supply system.

Figure 2:
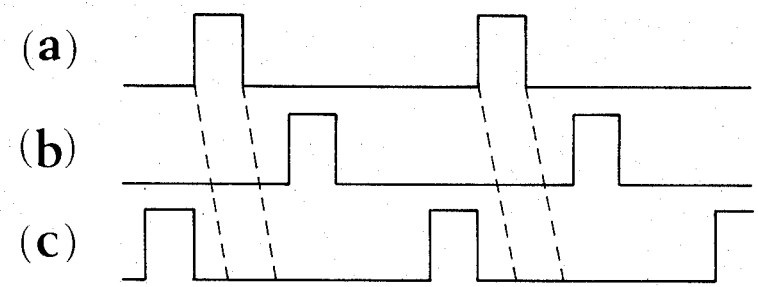
FIG. 2 is a timing chart showing the prior art battery saving type power supply system.

If respective battery saving type power supply is executed at timings shown in FIG. 2 where section (a) illustrates a power supply voltage to a receiver in the repeater 2, section (b) a receiver power supply voltage in the repeater 3 and section (c) a receiver an intermittent power supply voltage in the terminal device 4, all of information would not be transmitted to the terminal device 4 from the base station 1 so that synchronization is impossible. Accordingly, even when the terminal device wishes to originate, any originating call cannot be permitted because of the lack of synchronization.

Thus, in the case of a TDM system, it is necessary to synchronize the battery saving type power supply systems so that in all repeaters, receivers are ON/OFF controlled synchronously for positively transmitting a synchronizing signal to the terminal device from the base station. This means that, in the case of the TDM system too, it is necessary to synchronously supply power according to the battery saving type system.

SUMMARY OF THE INVENTION

Accordingly, it is an object of this invention to provide a novel power supply system for a radio communication system capable of supplying power according to the battery saving type system even in a TDM system including a plurality of repeaters.

Briefly stated, according to this invention, a specific synchronizing signal (hereinafter called BS-SYNC) is sent out from a base station and all devices in a communication system perform battery saving type power supply according to the synchronizing signal. Furthermore, received data are transmitted from a transmitter towards stations on the downstream side according to the synchronism of the battery saving type power supply. Respective stations start to supply power with the battery saving type by detecting the BS-SYNC signal and stop battery saving when absence of the BS-SYNC signal is detected.

The power supply system of this invention is effective for a TDM system, especially for such a system including one or more repeaters because the TDM system operates in the form of a digital transmission and because the effectiveness of the digital transmission is possible where a regenerative repeating is possible, and deterioration of the quality of the communication is small.

In other words, even with a small transmission output, the spacing between repeaters can be increased, and even when the number of repeatings increases, the quality of the communication signal is not impaired. As a consequence, communication service can be made over a much wider area. The reason for using radio communication lies in that it is difficult to install communication wires or power supply lines from the standpoint of economical and geographical limitations. Especially, repeaters are installed on mountains or locations where commercial power is difficult to obtain. Solar cells or wind electric power generators generate only a small amount of power, so that an improved power supply system that consumes less power has been desired.

The power supply system of this invention in which only minimum necessary power is supplied during the idle time of the communication system greatly contributes to the saving of power in conjunction with the digital transmission.

According to this invention, there is provided a power supply system for use in a radio communication system comprising a base station for transmitting and receiving radio signals, one or more repeating stations for repeating the radio signals, and a terminal station communicating with the base station through the repeater stations, characterized in that the base station comprises means for transmitting synchronizing signal pulses at a predetermined period for effecting a battery saving type power supply, and each of the repeater station and terminal station comprises means, responsive to successive reception of a predetermined number of the synchronizing signal pulses, for effecting intermittent battery saving at a period substantially equal to the period of the synchronizing signal pulses during occurrence of the synchronizing signal pulses.

DESCRIPTION OF THE PREFERRED EMBODIMENTS

FIG. 4 shows a block diagram of a base station in which external signals are received by a line concentrator 5 through an antenna 6, an antenna duplexer 7, a receiver 8 and a decoder 9 while signals are sent to repeaters through an encoder 10, a transmitter 11, the antenna duplexer 7, and the antenna 6. A telephone exchange 12 is connected to the line concentrator 5. An originating call signal detector 13 is connected between the decoder 9 and the line concentrator 5, while a terminating call signal generator 14 is connected between the encoder 10 and the line concentrator 5. The outputs of the detector 13 and the originating call signal generator 14 are inputted to an OR gate circuit 15, and its output is applied to a synchronizing pulse generator 16 for battery saving. The synchronizing pulse generator 16 is connected to the encoder 10 via a BS-SYNC signal generator 17.

Figure 5:
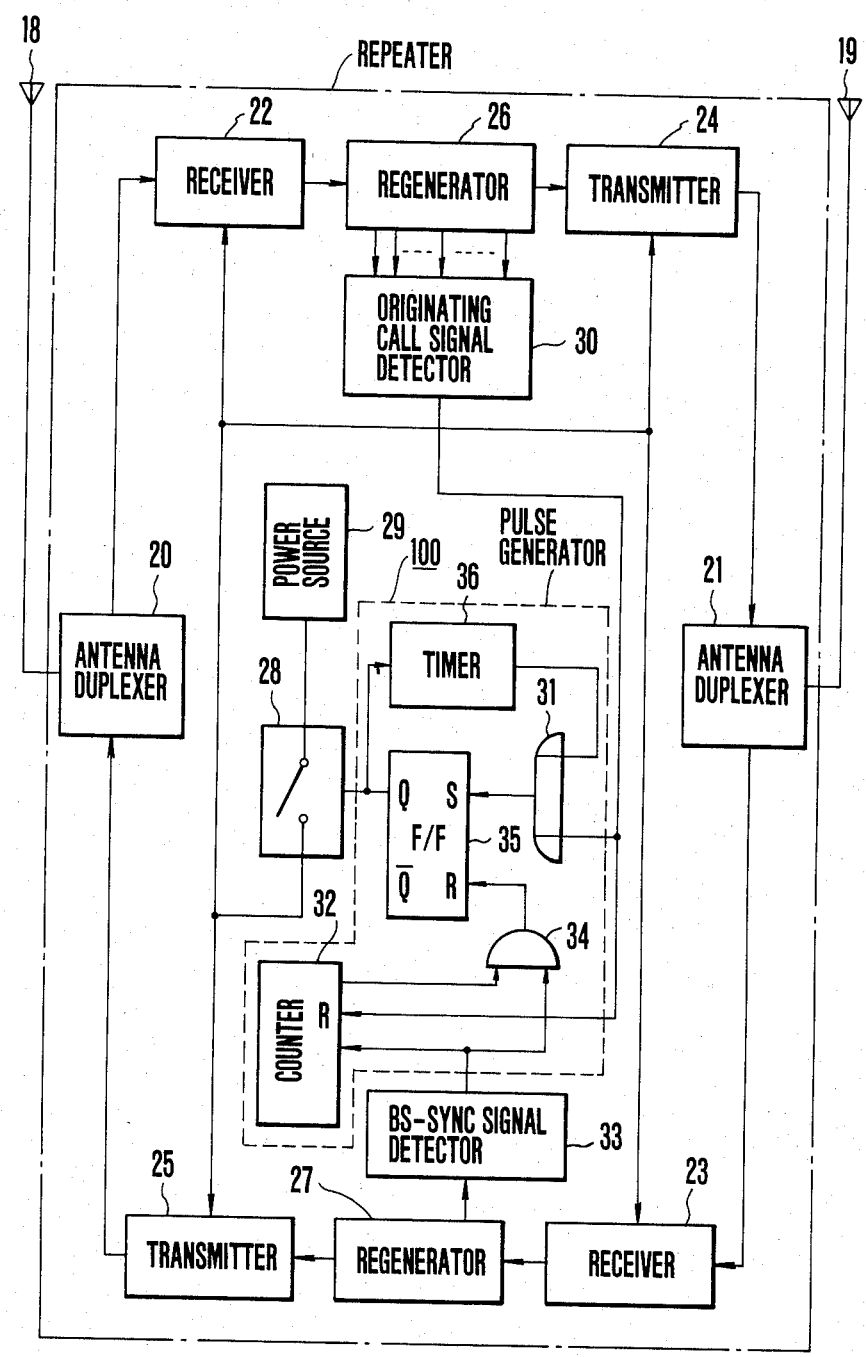
FIG. 5 is a block diagram showing a repeater embodying the invention.

FIG. 5 is a block diagram showing a repeater embodying the invention, in which 18 and 19 show antennas, 20 and 21 antenna duplexers, 22 and 23 receivers, 24 and 25 transmitters, and 26 and 27 regenerators which are connected as shown. Receivers 22 and 23, and transmitters 24 and 25 are connected to a power source 29 through a switch 28. An originating call signal detector 30 is connected to the regenerator 26, and the output of the detector 30 is supplied to one input of an OR gate circuit 31 and to a reset terminal R of a counter 32. To the regenerator 27 is connected a BS-SYNC signal detector 33, the output thereof being supplied to the clock input of the counter 32 and to one input of an AND gate circuit 34. The output of the counter 32 is supplied to the other input of the AND gate circuit 34, the output thereof being supplied to the reset terminal R of a flip-flop circuit 35. The Q output of the flip-flop circuit 35 is supplied to the control terminal of switch 28 and to the other input of the OR gate circuit 31 via a timer 36. The output of the OR gate circuit 31 is supplied to the set terminal S of the flip-flop circuit 35. A pulse generator 100 includes the OR gate circuit 31, counter 32, AND gate circuit 34, flip-flop circuit 35 and timer 36.

Figure 6:
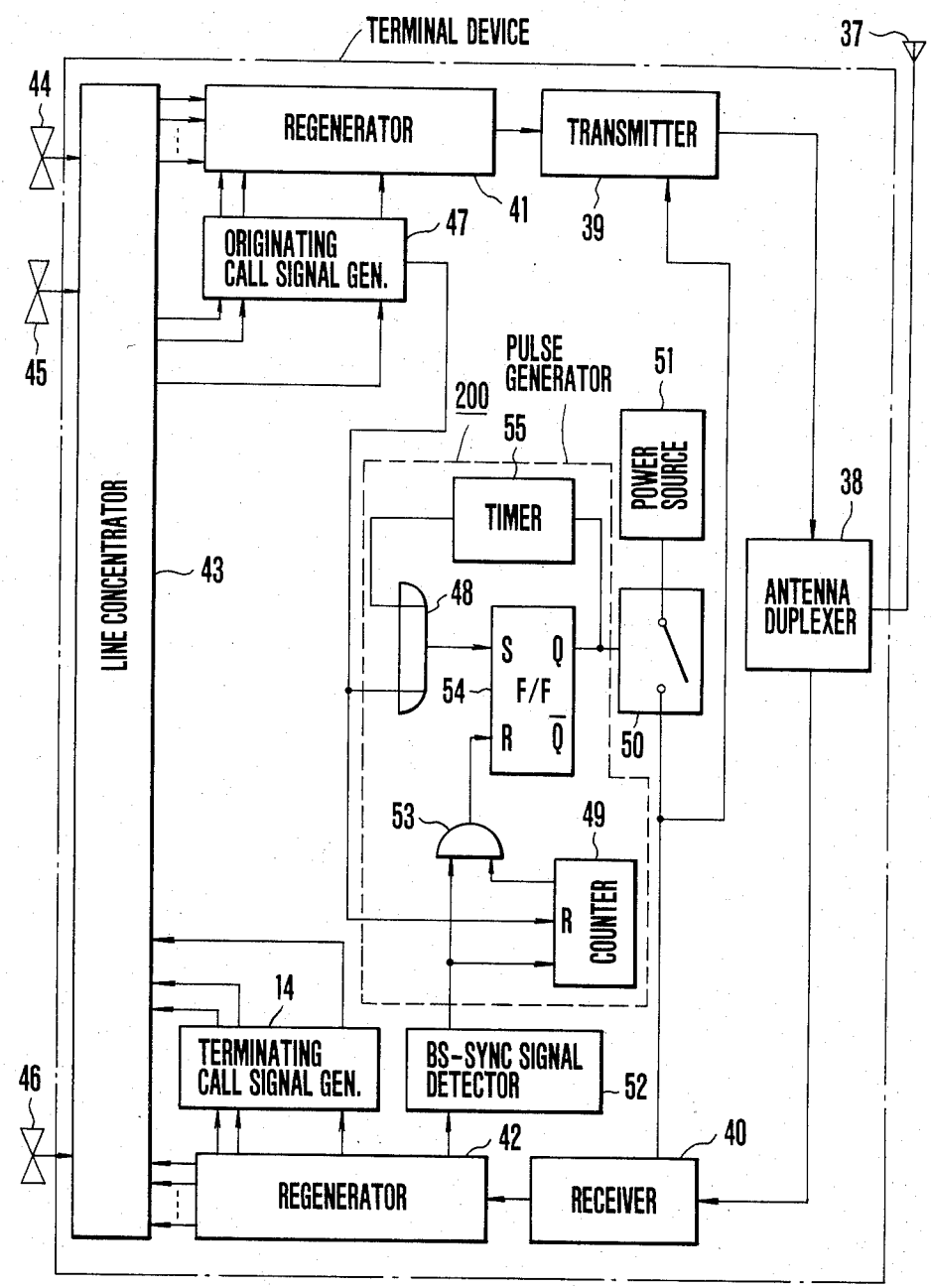
FIG. 6 is a block diagram showing a terminal device embodying the invention.

FIG. 6 is a block diagram showing a terminal device embodying the invention in which 37 designates an antenna, 38 an antenna duplexer, 39 a transmitter, 40 a receiver, 41 and 42 regenerators, 43 a line concentrator, 44, 45 and 46 telephone sets.

An originating call signal generator 47 is connected between the line concentrator 43 and the regenerator 41. The output of the originating call signal generator 47 is supplied to one input of an OR gate circuit 48 and the reset terminal R of a counter 49. The transmitter 39 and the receiver 40 are connected to a power source 51 through a switch 50. To the regenerator 42 is connected a BS-SYNC signal detector 52, the output thereof being supplied to the clock input of the counter 49 and one input of an AND gate circuit 53 with other input supplied with the output of the counter 49. The output of the AND gate circuit 53 is applied to the reset terminal R of a flip-flop circuit 54. The Q output of this flip-flop circuit 54 is connected to the control terminal of the switch 50 and to the other input of the OR gate circuit 48 via a timer 55. A pulse generator 200 includes the OR gate circuit 48, counter 49, AND gate circuit 53, flip-flop circuit 54 and timer 55.

Figure 3:
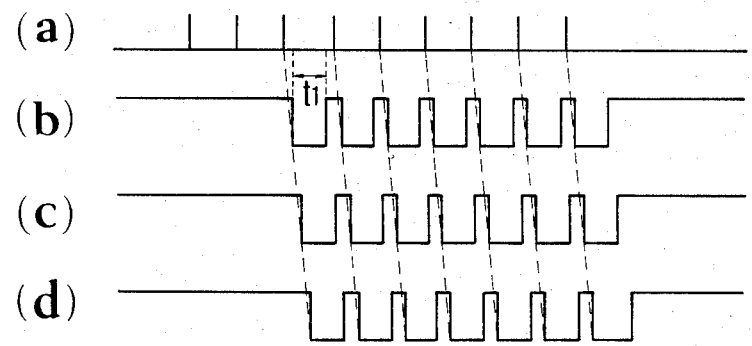
FIG. 3 is a timing chart showing the battery saving type power supply system embodying the invention.

The system of this invention operates as follows. In FIG. 1, at the initial state, the repeaters 2 and 3 and the terminal device 4 operate to constantly supply power to the transmitter and receiver. When the talking lines are idle, the base station sends out a synchronizing signal (BS-SYNC signal) of a predetermined period for the battery saving type power supply, as shown at section (a) in FIG. 3. Illustrated at sections (b) through (d) in FIG. 3 are power supply voltage waveforms in the repeaters 2 and 3 and the terminal device 4. Thus, when the repeaters 2 and 3 and the terminal device 4 detect thrice, for example, the BS-SYNC signal at a correct period, the battery power saving type power supply is initiated. The interval of the ON/OFF operation of the power supply is predetermined such that the BS-SYNC signal sent out from the base station at a predetermind period must be received while the power is being supplied to the transmitters and receivers of the repeaters 2 and 3 and the terminal device 4. More particularly, when the repeaters 2 and 3 or the terminal device 4 continuously detect 3 times the BS-SYNC signal, the supply of power to the transmitters and receivers in these stations are interrupted for a definite time (t1 shown at (b) in FIG. 3) before the fourth BS-SYNC signal arrives. Thereafter, power is again supplied to detect the fourth BS-SYNC signal and in response to the detection, the source is again ON/OFF controlled for a predetermined time. This cycle of operation is repeated. Thus, the power is supplied intermittently to save power consumption.

Where no more BS-SYNC signal is detected, the battery saving type power supply is stopped until the signal is again continuously detected 3 times.

The terminating call operation will now be described. At the base station, when a terminating call to the terminal device is detected, the transmission of the BS-SYNC signal is stopped at once. Accordingy, the battery saving in all stations is stopped. Thereafter, a talking line is connected to commence talking.

In the case of an originating call, the terminal device 4 sends out an originating call signal. This signal is transmitted to the base station 1 while the transmitters and receivers of all stations are operating. As the base station detects the originating call signal, the BS-SYNC signal is terminated in the same manner as in a terminating call signal. As a result, the battery saving type power supply is stopped in all stations to connect a talking line.

When all talking lines are interrupted, the base station transmits again the BS-SYNC signal to resume the battery saving type power supply.

The operations of the base station, the repeaters and the terminal device will be described in more detail.

In FIG. 4, when both originating call and terminating call are not made, the synchronizing pulse generator 16 for the battery saving type power supply operates, and in response to its output, the BS-SYNC signal generator 17 operates, and the BS-SYNC signal thus generated is sent to the repeaters and the terminal device through encoder 10, transmitter 11, antenna duplexer 7 and antenna 6. When the telephone exchange 12 produces a terminating call signal, it is detected by a ringer in the line concentrator 5, and the terminating call signal generator 14 produces terminating call signals for respective time divisioned time slots. When the terminating call signal is detected even in only one time slot, the OR gate circuit 15 is enabled to stop the operation of the synchronizing pulse generator 16 for the battery saving type power supply.

On the other hand, in the case of an originating call, the originating call signal transmitted from the terminal device 4 via repeaters will be detected by the originating call signal detector 13 via antenna 6, antenna duplexer 7, receiver 8 and decoder 9. In accordance with the output of the originating call signal detector 13, the line concentrator 5 connects a time slot in which the originating call has been commenced to the telephone exchange 12. At the same time, the OR gate circuit 15 is enabled to stop the operation of synchronizing pulse generator 16 for the battery saving type power supply.

As described above, where there is an originating call or a terminating call, the transmission of the BS-SYNC signal is stopped, whereas when neither the originating call nor the terminating call is present, the transmission of the BS-SYNC signal continues.

Turning now to FIG. 5, when neither the terminating call nor originating call present, the base station transmits the BS-SYNC signal which is detected by the BS-SYNC signal detector 33 via antenna 19, antenna duplexer 21, receiver 23 and regenerator 27. The number of the BS-SYNC pulse outputted by the detector 33 is counted by the counter 32 and when its count reaches a predetermined value (three in an example shown in FIG. 3), its output is applied to the reset input R of the flip-flop circuit 35 via AND gate circuit 34.

Thus, the flip-flop circuit 35 is reset by the BS-SYNC pulse to apply an output to switch 28 for opening the same, thereby interrupting the power supply to receivers 22 and 23, and transmitters 24 and 25 from the power source 29. At the same time, this output of the flip-flop circuit 35 starts operating the timer 36. After a predetermined time interval $t_1$ in FIG. 3 which is determined by the timer and which is slightly shorter than the period of the BS-SYNC signal, the timer produces an output to enable the OR gate circuit 31 for setting again the flip-flop circuit 35, whereby power is supplied again to receivers 22 and 23 and transmitters 24 and 25 until the supply of power is stopped in response to the next BS-SYNC signal (the fourth BS-SYNC signal in FIG. 3). While the power is being supplied to the receivers and transmitters, the BS-SYNC signal is transmitted to the repeaters and the terminal device on the downstream side via transmitter 25, antenna duplexer 20, and antenna 18. In this manner power is supplied to the repeaters by the battery saving type power supply system in accordance with the BS-SYNC signal sent from the base station. When a terminating call occurs, the battery saving is terminated since the BS-SYNC signal from the base station is stopped.

When an originating call occurs, the originating call signal is detected by the originating call signal detector 30 via antenna 18, antenna duplexer 20, receiver 22, and regenerator 26. The output produced by the detector 30 enables the OR gate circuit 31 to set the flip-flop circuit 35, whereby the switch 28 is closed to supply power to the transmitters and receivers from the power source 29. At the same time, the counter 32 is reset by the output of the originating call signal detector 30 and the source power is supplied to the transmitters and receivers for an interval sufficient for the count of the counter 32 to reach a predetermined number. Consequently, the originating call signal will be transmitted to the base station via transmitter 24, antenna duplexer 21 and antenna 19. Upon detection of the originating call signal, the base station immediately stops the generation of the BS-SYNC signal so that the battery saving type power supply of the repeaters is also stopped.

In FIG. 6, the terminal device also operates in the same manner as the repeaters. An originating call signal is produced by the originating call signal generator 47 when the hook-off condition of the telephone sets 44, 45 and 46 is detected by the line concentrator 43. Thus, when either one of the telephone sets 44, 45 and 46 hooks OFF, the OR gate circuit 48 is enabled by the output of the originating call signal generator 47 to set the flip-flop circuit 54. At the same time, since the counter 49 is reset, power is supplied to the transmitter 39 and the receiver 40 from the power source 51 for a sufficient time described above. During this interval, an originating call signal is sent to the base station so as to stop the battery saving type power supply in the same manner as in the repeaters. In the case of terminating call too, since transmission of the BS-SYNC signal from the base station is stopped, the battery saving type power supply is stopped in the same manner as in the repeaters.

Figure 7:
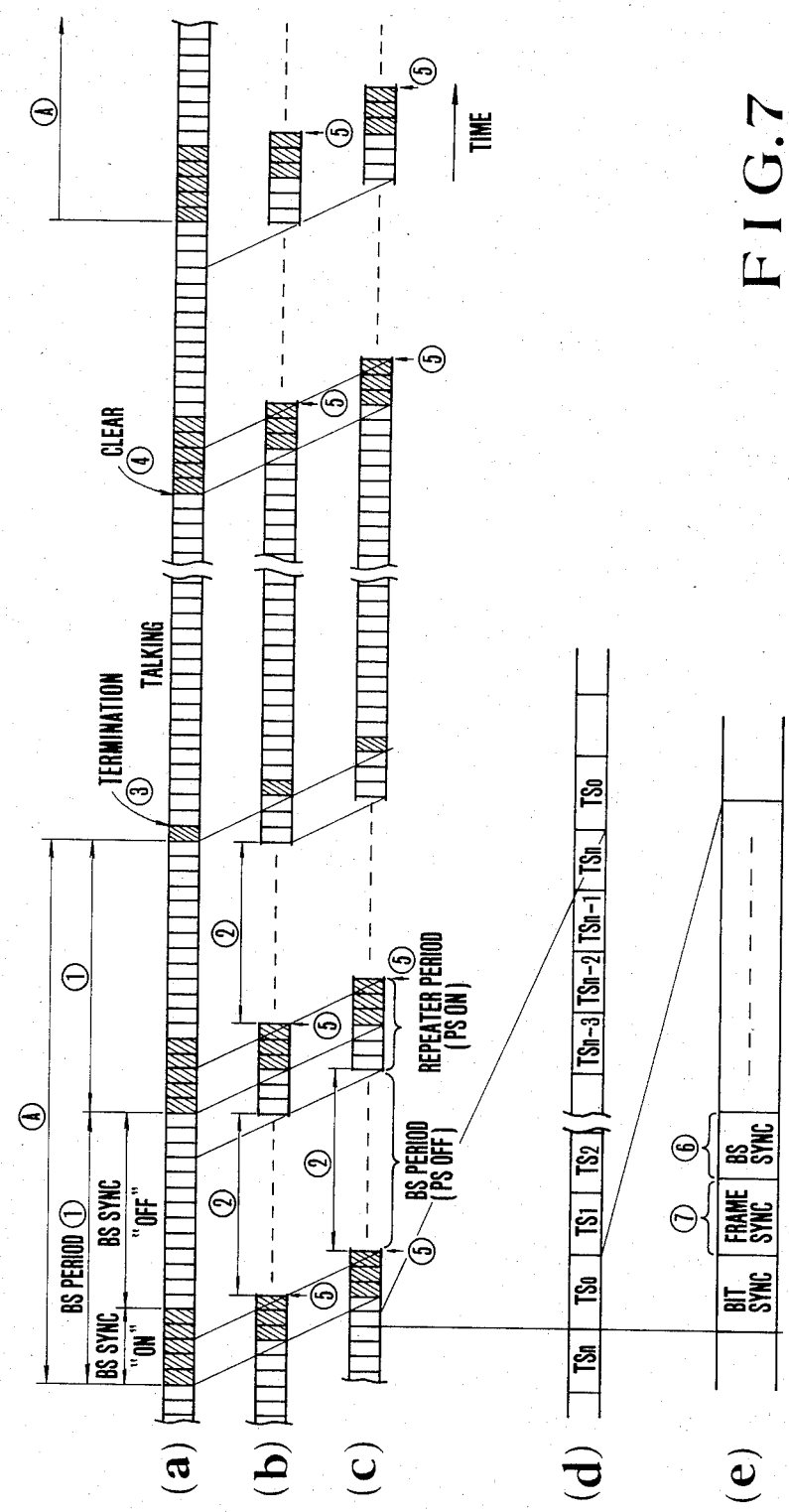
FIG. 7 is a timing chart showing the battery saving type power supply system embodying the invention.

Referring to FIG. 7, the signal format of the BS-SYNC on time division-multiplex basis will be described in greater detail. FIG. 7 shows in sections (a) through (c) data signals respectively transmitted from the base station 1, the first repeater 2, and the second repeater 3. A string of control time slots $TS_o$ to $TS_n$ within one frame of the data signal is shown at section (d) in FIG. 7, and a string of signals contained in the time slot $TS_o$ is illustrated at (e) in FIG. 7. Especially, in the data signal at sections (a) to (c), a hatched frame contains a time slot $TS_o$ in which the BS-SYNC signal occurs and a non-hatched (blank) frame contains a time slot $TS_o$ in which the BS-SYNC signal does not occur.

At the initial state, the receivers in the repeaters 2 and 3 and the terminal device 4 are always maintained in an operative state. As shown by a portion A in FIG. 7, the base station sends out the BS-SYNC signal of a definite period while any talking line is not used.

As shown by a portion ⑥ in FIG. 7, the BS-SYNC signal is arranged in a time slot $TS_o$ containing a frame synchronizing signal (portion ⑦), which time slot is periodically sent out from the base station. At each period, the data in that time slot is stored in a RAM, and the CPUs in the repeaters and the terminal device read the data in the RAM to detect the BS-SYNC signal when there is a BS-SYNC bit. When the BS-SYNC signal is detected 3 times at a correct period (portion ⑤), the battery saving type power supply is started and the next interval of supplying the power is determined such that the BS-SYNC signal sent at a predetermined period (portion ①) during the operation of the receiver will be exactly received (portion ②). As the BS-SYNC signal is not detected, the battery saving type power supply is stopped until this signal is detected again 3 times continuously.

When a repeater detects a frame synchronizing signal (portion ⑦) contained in the control time slot, it repeats all data in the control time slot to a succeeding repeater. In other time slots, a sub-frame synchronizing signal is detected to be repeated in the same manner. As described above, the repeating operation continues until the BS-SYNC signal is detected three times, so that a control time slot where the BS-SYNC signal bit is raised is sent at least three times to any station. Accordingly, as soon as the frame synchronizing signal is detected under the supply of power a predetermined time after initiation of the battery saving, the repeating operation is initiated which continues until the BS-SYNC signal is detected again three times.

At first let us consider a terminating call operation. When arrival of a terminating call signal is detected at the terminal device, the base station immediately stops the BS-SYNC signal (portion ③). This stops the battery saving type power supply in all stations. After that, a talking line is connected, permitting talking.

In the case of an originating call, the terminal device sends out an originating call signal which is transmitted to the base station while the receivers of all stations are operating. When the base station detects the originating call signal, it stops transmission of the BS-SYNC signal in the same manner as in the case of terminating call, with the result that the battery saving type power supply in all stations is stopped and the talking line is connected.

When all talking lines are interrupted, the base station transmits again the BS-SYNC signal to resume the battery saving type power supply (portion ④).

As described above, according to this invention, a BS-SYNC signal is transmitted at a definite period from a base station, and repeaters and a terminal device perform the battery saving type power supply in synchronism with the BS-SYNC signal. According to this system, the battery saving type power supply is possible even in a TDM system including a plurality of repeaters.

Furthermore, so long as the communication system is of the time division type, this invention is applicable to either the digital or the analogue type. The BS-SYNC signal may be of any type of signal format.

What is claimed is:

1. In a power supply system including one or more batteries for use in a radio communication system comprising a base station for transmitting and receiving radio signals, one or more repeater stations for repeating said radio signals, and a terminal station communicating with said base station through said one or more repeater stations, the improvement wherein said base station comprises means for transmitting synchronizing signal pulses at a predetermined period, and each of said one or more repeater stations and said terminal station comprise means, responsive to successive reception of a predetermined number of said synchronizing signal pulses, for effecting intermittent battery saving during intervals of time substantially equal to the period of said synchronizing signal pulses.

2. In a power supply system for use in a radio communication system comprising a base station for transmitting and receiving radio signals, one or more repeater stations for repeating said radio signals, each of said one or more repeating stations having one or more batteries for use as a power source and respective radio signal repeating means, and a terminal station communicating with said base station through said one or more repeater stations, the improvement wherein said base station comprises means for transmitting synchronizing signal pulses at a predetermined period and each of said one or more repeater stations comprises first means for detecting said synchronizing signal pulses, and switch means controlled by the output signal of said first means for intermittently connecting and disconnecting said one or more batteries of said one or more repeater stations to said respective radio signal repeating means during time intervals substantially equal to said predetermined period.

3. A power supply system according to claim 2 wherein said switch means comprises a switch and second means for controlling said switch disposed between said switch and said first means, said second means being responsive to successive reception of a predetermined number of said synchronizing signal pulses, for producing an output signal which opens said switch, said second means including timer means, responsive to said output signal generated by said second means to produce a timer output signal after a predetermined time interval, wherein said timer output signal causes said switch to close.

4. A power supply system according to claim 3 wherein said second means comprises a flip-flop circuit which is reset by the output signal of said first means to produce the output signal for opening said switch and starting said timer means and which flip-flop circuit is set by the timer output signal which causes said switch to close.

5. A power supply system according to claim 4 wherein an originating call signal received by one or more of said repeater stations sets its respective flip-flop circuit.

6. In a power supply system for use in a radio communication system comprising a base station for transmitting and receiving radio signals, one or more repeater stations for repeating said radio signals, and a terminal station communicating with said base station through said one or more repeater stations, the improvement wherein said base station comprises means for transmitting synchronizing signal pulses at a predetermined period and each of said one or more repeater stations and said terminal station comprises power source means, synchronizing signal detecting means, and means for generating a a plurality of pulses wherein said generating means is activated in response to detection of synchronizing signal pulses to operate said power source means intermittently, the intermittent operation of said power source means ceasing in response to no detection of said synchronizing signal pulses.

7. A power supply system according to claim 6 wherein said generating means comprises a counter responsive to an output signal of said synchronizing signal detecting means, an AND gate receiving at one input and output signal of said counter and at the other input the output signal of said synchronizing signal detecting means, a flip-flop circuit having a reset terminal connected to the output of said AND gate, and a timer responsive to a set output signal of said flip-flop circuit to produce a timer output signal applied to a set terminal of said flip-flop circuit through an OR gate.

* * * * *